Patented Apr. 7, 1931

1,800,159

UNITED STATES PATENT OFFICE

GEORG SCHROETER, OF BERLIN, GERMANY, ASSIGNOR TO NEWPORT MANUFACTURING COMPANY, OF CARROLLVILLE, WISCONSIN, A CORPORATION OF DELAWARE

PURIFICATION OF NAPHTHALENE

No Drawing. Original application filed August 29, 1921, Serial No. 496,639, and in Germany February 24, 1915. Divided and this application filed March 28, 1925. Serial No. 19,144.

I have filed applications, in Germany February 24, 1915 (Patent No. 324,861 issued to assignee, Tetralin G. m. b. H.); in Germany December 7, 1915 (Patent No. 324,862 issued to assignee, Tetralin G. m. b. H.); in Germany May 13, 1916 (Patent No. 324,863 issued to assignee, Tetralin G. m. b. H.); and in Belgium, filed May 31, 1920; in France filed May 21, 1920; in Great Britain filed July 8, 1920; in Italy filed June 30, 1920; in Austria filed April 15, 1920; in Hungary filed July 31, 1917; in the Netherlands filed April 21, 1920; in Switzerland, filed June 30, 1920, and in Czechoslovakia filed July 10, 1920.

The present invention relates to purification of commercial naphthalene, and particularly to a purification thereof to an extent sufficient to remove therefrom elements which act as catalyzer poisons when naphthalene is subjected to hydrogenation in the presence of a catalyst. The present application is a division of my copending application Ser. No. 496,639, filed August 29th, 1921, which was granted to me on April 27th, 1926, as Patent No. 1,582,310.

It has long been known that even the purest commercial (i. e. technically produced) naphthalene stubbornly retains certain small amounts of impurities, especially methylated coumarone and corresponding sulfur compounds, which substances cause a red coloration when commercial naphthalene is subjected to treatment with concentrated sulfuric acid. It was also known that by boiling commercial naphthalene with acetate of mercury in alcoholic solution, certain mercury compounds were produced which were not mercury compounds of thionaphthalene. It has also previously been known that ordinary purified naphthalene contains sulphur compounds and it has been proposed to purify naphthalene from these sulfur compounds by repeated crystallization from various organic solvents. Such processes would, however, not be commercially feasible in connection with the commercial hydrogenation of naphthalene.

In accordance with the present invention, the naphthalene treated, namely, commercial or technical naphthalene, can be purified by treating it in a molten state with fuller's earth, infusorial earth, animal charcoal or the like, that is, any porous and finely-divided material, which naturally contains small quantities of metal oxides, such as lime, and which material is also capable of absorbing or adsorbing coloring matters, resinous substances or other materials of high molecular weight. The naphthalene can then be removed by filtering or by distillation at a temperature which is not sufficiently high to cause undesired side reactions, for example, in vacuo. This purification may sometimes not be sufficiently complete and a more complete purification can be effected by the use, instead of the above mentioned porous materials alone, of fuller's earth, upon which is precipitated a small amount, say, 1 or 2 percent or so, of reduced nickel, reduced iron or other like metal. Although I am aware that a number of apparently unrelated metals will effect a similar purification, I am unable to classify them generically so that they will fall into a natural group. During this purification step, it is advisable to agitate by stirring, pumping, etc. in the presence of hydrogen. The temperature in this operation should be kept above 100° C.

These metals also can be used alone in a finely-divided state for the purification of naphthalene.

Another method of purifying the naphthalene, which reduces the impurities to a very small quantity, involves the treatment of the molten naphthalene with small percentages of metallic sodium or potassium or other easily melted metals of like properties. In this operation it is advisable to treat the molten naphthalene with, say, from one-half to one and one-half percent of metallic sodium or potassium at a temperature above 100° C., for several hours. It will be noted that the metals named all have an affinity for sulphur and sulphur compounds.

Another useful method of purifying the naphthalene is by treating the same in a molten state (after a preliminary distillation if desired) with small amounts of metal compounds which contain a metal loosely combined with a non-acid radical or element.

Examples of such compounds are the metal-ammonia compounds, metal amids (such as sodium or potassium amid), metal carbides (such as aluminium or calcium carbides), or other metal compounds of acetylene.

It is of course, to be understood that these various methods of purification above given can be used each by itself, or two or more of these methods can be used in conjunction with each other.

Naphthalene purified according to the above processes does not produce any red coloration when treated with concentrated sulfuric acid. If it is found that the purification of a particular batch has not been sufficiently completed, it is advisable to again subject this material to a retreatment according to one or the other of the above mentioned processes.

The naphthalene, after its purification, can be separated from the residue of the purifying agents, or from the compounds produced by the union of the impurities with the purifying agents, by hot pressure filtration in hydrogen, or by distillation at a relatively low temperature, distillation in vacuo being a preferred mode of operation.

The purified naphthalene can then be subjected to hydrogenation in the presence of finely-divided nickel as a catalyst, or otherwise in accordance with the methods set forth in my application above referred to, without injury to the catalyst. It may be added that the purification of naphthalene from those substances which produce red coloration upon treatment with sulfuric acid, not only makes the catalyzer last better, that is to say—retain its usefulness for a long period, but also renders the hydrogenation of the naphthalene much easier and more readily controlled.

The highly impure varieties of naphthalene which give a deep red color with sulfuric acid, can be purified according to the processes herein described, and subsequently hydrogenated.

The following is an illustrative example of the method embraced by the present invention, but is by no means to be taken as a limitation of its scope.

*Example.*—100 kilos of commercial naphthalene in a kettle at a temperature above 100° C., are stirred with 5 to 10% or more of finely divided absorbent earth, until a sample of the material, after being substantially separated, shows no red coloration when treated with concentrated sulfuric acid, after standing for some time.

It is to be understood that, while I have mentioned certain preferred substances through the use of which my invention may be carried into effect, I do not limit my invention to the use of these specific substances. It is to be further understood that in the following claims the term "porous material" is intended to include and to be limited to the porous materials which have been mentioned in the specification. These materials are: finely divided porous materials which naturally contain small quantities of metal oxides, such as lime, and which material is also capable of absorbing or adsorbing coloring matter, resinous substances, or other material of high molecular weight.

I claim:

1. A process for the purification of naphthalene containing appreciable amounts of impurities capable of producing a red coloration on treatment with concentrated sulfuric acid, which comprises treating such naphthalene at above its melting point with a porous material containing small quantities of metal oxides and separating the naphthalene therefrom.

2. In the process of purifying naphthalene to remove catalyzer poisons the step which comprises treating naphthalene in the fluid condition with a porous material containing small quantities of metal oxides.

3. A process for the purification of naphthalene containing appreciable amounts of impurities capable of producing a red coloration on treatment with concentrated sulfuric acid, which comprises treating such naphthalene at above its melting point with a porous material containing small quantities of metal oxides and separating the naphthalene therefrom by distillation.

4. A process for the purification of naphthalene containing appreciable amounts of impurities capable of producing a red coloration on treatment with concentrated sulfuric acid, which comprises treating such naphthalene at above its melting point with absorbent earth containing small quantities of metal oxides and then separating the naphthalene from the absorbent earth.

5. A process for the purification of naphthalene containing appreciable amounts of impurities capable of producing a red coloration on treatment with concentrated sulfuric acid, which comprises treating such naphthalene at above its melting point with a porous material containing small quantities of metal oxides and a finely divided metal having an affinity for sulphur and sulphur compounds and separating the naphthalene.

6. In the process of purifying naphthalene to remove catalyzer poisons, the step which comprises treating naphthalene in the fluid condition with a porous material containing small quantities of metal oxides and a finely divided metal having an affinity for sulphur and sulphur compounds.

7. A process for the purification of naphthalene containing appreciable amounts of impurities capable of producing a red coloration on treatment with concentrated sulfuric acid, which comprises treating such naphthalene at above its melting point with a porous material containing small quantities of metal oxides and a finely divided metal having an affinity for sulphur and sulphur compounds and separating the naphthalene therefrom by distillation.

8. A process for the purification of naphthalene containing appreciable amounts of impurities capable of producing a red coloration on treatment with concentrated sulfuric acid, which comprises treating such naphthalene at above its melting point with absorbent material containing small quantities of metal oxides and a finely divided metal having an affinity for sulphur and sulphur compounds, and then separating the naphthalene from the absorbent earth.

9. The process for the purification of naphthalene containing appreciable amounts of impurities capable of producing a red coloration on treatment with concentrated sulfuric acid, which comprises treating such naphthalene at above its melting point with a porous material containing small quantities of metal oxides and a finely divided metal having an affinity for sulphur and sulphur compounds, in the presence of hydrogen, and separating the naphthalene.

10. In the process of purifying naphthalene to remove catalyzer poisons, the step which comprises treating naphthalene in the fluid condition with a porous material containing small quantities of metal oxides and a finely divided metal having an affinity for sulphur and sulphur compounds, in the presence of hydrogen.

11. A process for the purification of naphthalene containing appreciable amounts of impurities capable of producing a red coloration on treatment with concentrated sulfuric acid, which comprises treating such naphthalene at above its melting point with a porous material containing small quantities of metal oxides and a finely divided metal having an affinity for sulphur and sulphur compounds in the presence of hydrogen, and separating the naphthalene therefrom by distillation.

12. A process for the purification of naphthalene containing appreciable amounts of impurities capable of producing a red coloration on treatment with concentrated sulfuric acid, which comprises treating such naphthalene at above its melting point with absorbent earth containing small quantities of metal oxides and a finely divided metal having an affinity for sulphur and sulphur compounds, in the presence of hydrogen, and then separating the naphthalene from the absorbent earth.

In testimony whereof I have signed my name to this specification.

GEORG SCHROETER.